United States Patent [19]

Fockens

[11] Patent Number: 5,039,996
[45] Date of Patent: Aug. 13, 1991

[54] METHOD OF PLACING AN ELECTRONIC RESPONDER IN OR NEAR AN ELECTRICALLY CONDUCTIVE ARTICLE, AS WELL AS AN ELECTRICALLY CONDUCTIVE ARTICLE PROVIDED WITH AN ELECTRONIC RESPONDER

[75] Inventor: Tallienco W. H. Fockens, Eibergen, Netherlands

[73] Assignee: N.V. Nederlandsche Apparatenfabriek Nedap, De Groenlo, Netherlands

[21] Appl. No.: 522,468

[22] Filed: May 14, 1990

Related U.S. Application Data

[63] Continuation of Ser. No. 155,707, Feb. 16, 1988, abandoned.

[30] Foreign Application Priority Data

Feb. 16, 1987 [NL] Netherlands ................. 8700369

[51] Int. Cl.[5] ........................................... H01Q 7/00
[52] U.S. Cl. ................................. 343/866; 343/789; 343/769
[58] Field of Search ............... 343/895, 866, 789, 767, 343/769, 746, 842, ; 340/825.31, 551, 572

[56] References Cited

U.S. PATENT DOCUMENTS

| 1,847,872 | 3/1932 | Hand | 343/842 |
|---|---|---|---|
| 2,343,306 | 3/1944 | Lear | 343/842 |
| 2,607,894 | 8/1952 | Johnson | 343/784 |
| 3,568,206 | 3/1971 | Sisson et al. | 343/895 |
| 4,196,418 | 4/1980 | Kip et al. | |
| 4,514,693 | 4/1985 | Meador | |

FOREIGN PATENT DOCUMENTS

| 1202365 | 8/1970 | United Kingdom . | |
| 1390514 | 4/1975 | United Kingdom | 343/895 |
| 2165359 | 4/1986 | United Kingdom . | |

Primary Examiner—Michael C. Wimer
Assistant Examiner—Hoanganh Le
Attorney, Agent, or Firm—Jacobson Fleit

[57] ABSTRACT

A method of placing an electronic responder of an electromagnetic interrogation system or an antenna coil of an electromagnetic interrogator device in or near an electrically conductive article. An opening is made in the article, which is larger than the responder or antenna coil, and the responder or the antenna coil is mounted in registry with said opening. There is also provided a slit in the article, extending from the opening, said slit interrupting extraneous circular currents.

22 Claims, 4 Drawing Sheets

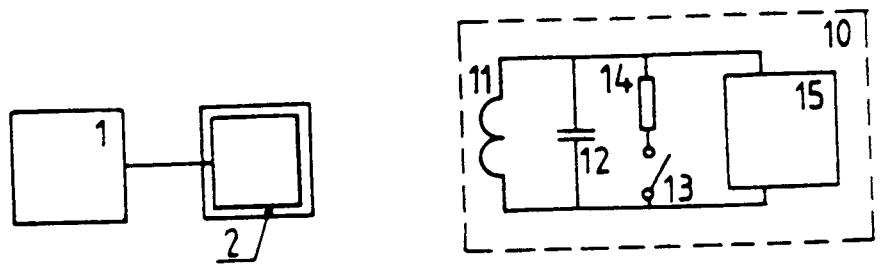
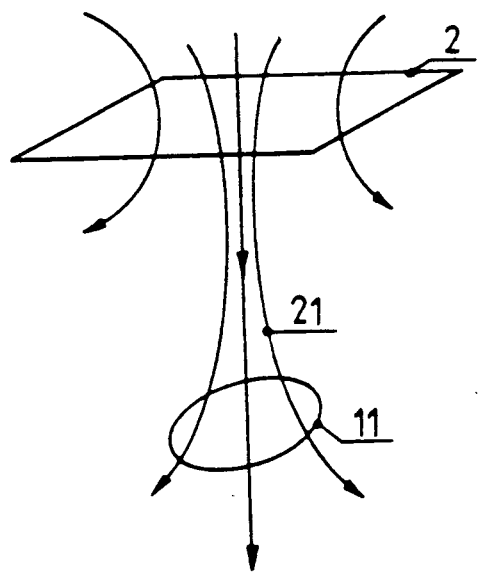
FIG.1
FIG.2

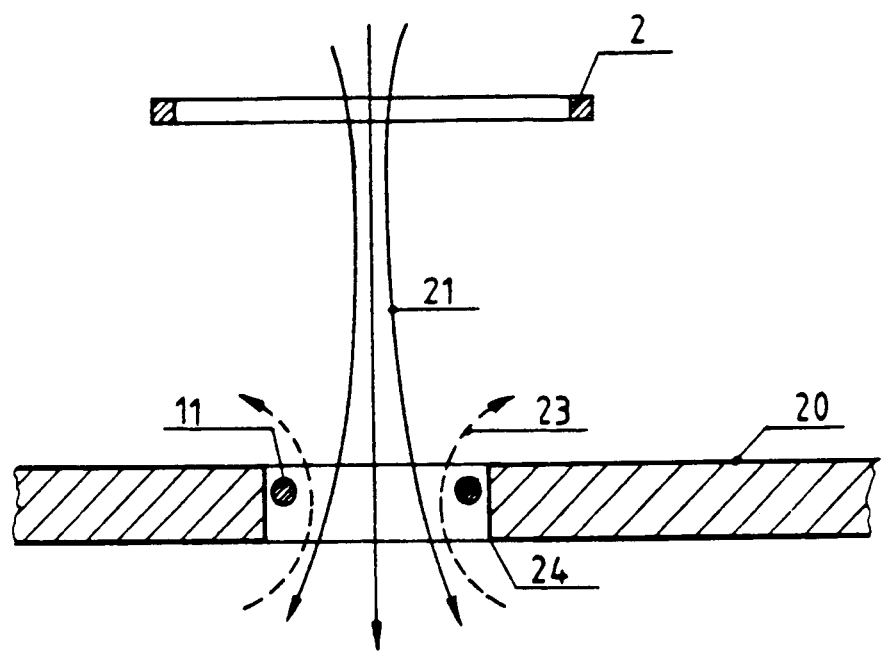
FIG·5
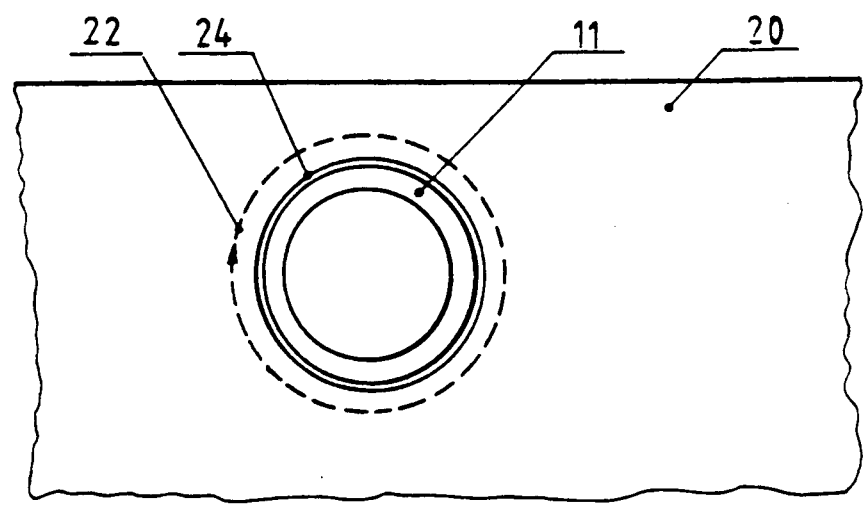
FIG·6

METHOD OF PLACING AN ELECTRONIC RESPONDER IN OR NEAR AN ELECTRICALLY CONDUCTIVE ARTICLE, AS WELL AS AN ELECTRICALLY CONDUCTIVE ARTICLE PROVIDED WITH AN ELECTRONIC RESPONDER

This application is a continuation of application Ser. No. 155,707, filed Feb. 16, 1988, now abandoned.

BACKGROUND OF THE INVENTION

1. Field of the Invention

This invention relates to a method of placing an electronic responder in an electrically conductive article, the responder being of the type having at least one coil designed as an antenna, which, in operation, receives an alternating magnetic field produced by an interrogation means.

2. Description of the Related Art

One example of such a responder is described in U.S. Pat. No. 4,196,418. This known responder comprises a coil forming part of a resonant circuit tuned to the predetermined frequency of an interrogation field. The responder further includes a code generator controlling a switch means which, in operation, varies the electrical properties of the resonant circuit in the rhythm of a code stored in the code generator. This variation can be detected by means of the interrogation means.

Although the responders described can be used in a great many situations for detection and identification purposes, the use of such responders for detection or identification of electrically conductive objects, such as metal articles or at any rate objects containing a large quantity of electrically conductive material has not been possible up to now.

The fact is that a good operation of these known and similar responders requires a good magnetically inductive coupling to be established between the at least one antenna coil of the responder and the antenna coil(s) of the interrogation means through which the interrogation field is produced. This means that the field lines of the interrogation field should at least partly extend through the region enclosed by the at least one antenna coil.

This condition can be met in a simple manner if both the coil of the interrogation means and the antenna coil of the responder are present in air or a different medium which is not an electrical conductor. However, if the responder is present on a metal article or is even recessed therein, no magnetic coupling is possible.

SUMMARY OF THE INVENTION

It is an object of the present invention to provide a solution for the above problem. To that end, according to the present invention, a method of the kind described above is characterized in that an opening is made in the article, which is in registry with the desired position of the responder and has larger dimensions than the outer dimensions of the responder coil, and that at least one slit extending from the opening is formed in the conductive article.

It is observed that, in principle, the same technique can be used for an antenna coil of an interrogator device if, for specific reasons, such coil would have to be placed in electrically conductive surroundings.

Accordingly, the present invention also provides a method of mounting an antenna coil near an electrically conductive surface, and is characterized in that an opening is made in the article that is in registry with the desired position of the antenna coil and which has larger dimensions than the outer dimensions of said antenna coil, and that at least one slit extending from the opening is formed in the conductive article.

BRIEF DESCRIPTION OF THE DRAWINGS

The present invention will now be described, by way of example, with reference to the accompanying drawings, in which:

FIG. 1 diagrammatically shows an example of an interrogator device with a responder associated with it;

FIG. 2 illustrates the magnetic coupling occurring, in operation, between the interrogator device and a responder;

FIGS. 5-7 illustrate the principle of the present invention; and

DESCRIPTION OF THE PREFERRED EMBODIMENT

Figure 3:
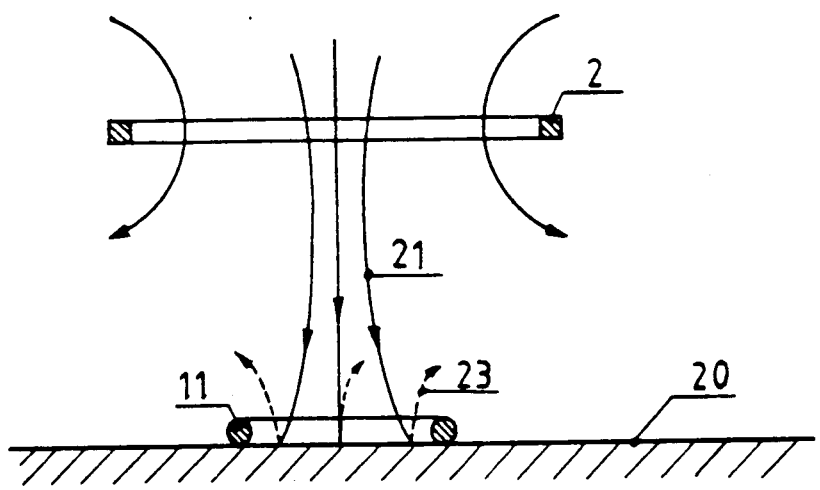
FIG. 3 and FIG. 4 illustrate the influence of a conductive surface.

FIG. 1 diagrammatically shows an example of an interrogator device, comprising a transceiver unit 1 and an antenna coil 2 connected thereto, by means of which a magnetic interrogation field can be produced in an interrogation zone. Also shown is a responder 10 having a receiving coil 11 which, together with a capacitor, forms a resonant circuit tuned to the frequency of the interrogation field, the electrical properties of said circuit being variable, in operation, by means of a switch 13. In this example, switch 13 can vary the attenuation of the resonant circuit through a resistor 14, under the control of a code generator 15.

In operation, the antenna coil 2 and the coil 11 of the responder should be magnetically coupled to one another to a sufficient extent. Coil 11 mostly has the shape of a loop antenna extending near the outer edges of the responder housing.

FIG. 2 diagrammatically shows the antenna coil 2 and the responder coil 11 coupled by a magnetic field having field lines 21. Both coils comprise a plurality of field lines.

Figure 4:
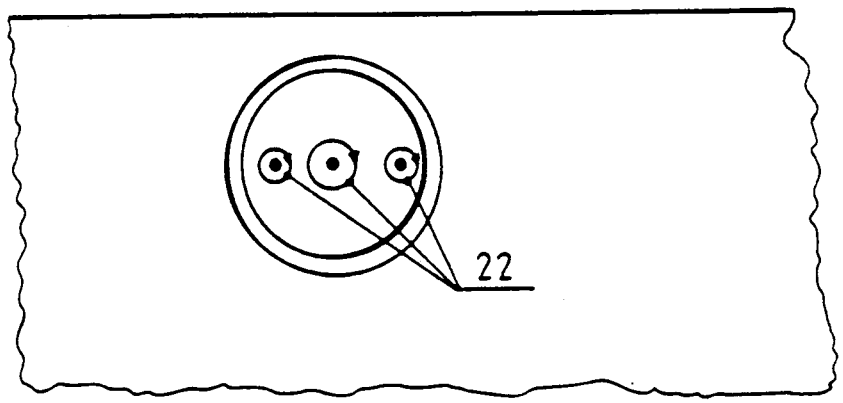

FIG. 3 shows the situation in case the responder is present near or on an electrically conductive article, such as a metal plate or flange 20. To realize a magnetic coupling, the field lines should penetrate the article 20. As the fields in question are alternating magnetic fields having a frequency f, circular currents will be produced around the incoming field lines. This is shown in FIG. 4, in which the circular currents are designated at 22. These currents, in their turn, produce magnetic fields 23, which are directed oppositely to the original incoming field, so that the resulting field is approximately zero. The resulting field intensity in the coil is then also zero and there is no coupling any longer with the coil of the transceiver unit.

Also a magnetic field produced by a current in the coil of the responder is strongly opposed by the conduction in the metal, so that the self-inductance of coil 11 is greatly reduced, thereby increasing the resonate frequency of the resonant circuit. Owing to the presence of the metallic portion, the operation of an interrogator device is thus additionally disturbed by the detuning of the resonant circuit.

It is an object of the present invention to eliminate these two effects, i.e. the strong reduction of the coupling between the coil of the transceiver unit and the coil of the electronic responder and the influence of the self-inductance of the coil of the responder. An essential aspect is that the electronic responder is placed in or on the conductive object to be identified in such a manner that the magnetic field lines traversing the coil of the responder cannot induce circular currents in the conductive article.

To that end, according to the present invention, in the situation shown in FIG. 3, first a hole is made in the metal plate or flange 20. The diameter of the hole is as at least as large as, or larger than, the diameter or maximum transverse dimension of the responder coil. As the coil defines the maximum dimensions of the responder, it is then also possible to recess the responder entirely into said hole. See FIG. 5, wherein 20 indicates the metal portion and 24 the hole drilled therein.

The magnetic field lines 21 traversing the coil 11 of the responder now no longer intersect a conductive metal surface. However, the metal surrounding the hole forms a closed electrical loop, so that there is still produced a circular current at that location as a result of the magnetic field lines 21 traversing the hole 24 and the coil.

The result of the circular current 22 around hole 24, shown in FIG. 6, is again a strong reduction of the coupling with the coil of the transceiver unit and a reduction of the self-inductance of the responder coil.

Consequently, according to the present invention, secondly, the surrounding closed loop is interrupted, which is effected by providing a slit in the metal portion from the hole to the outer edge of the metal portion.

Figure 7:
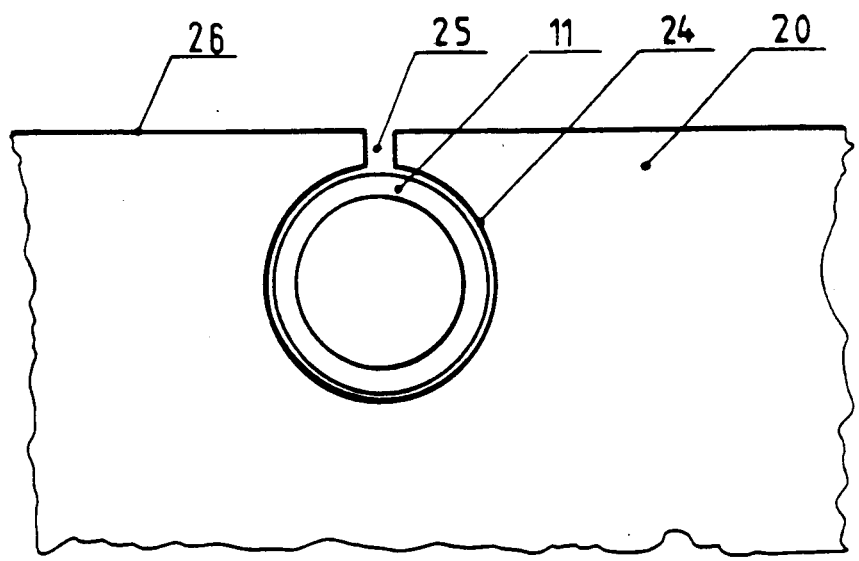

FIG. 7 shows such a slit at 25 and the metal portion at 20 with an outer edge 26, wherein the electronic responder 10 is recessed into the milled hole 24. The metal portion shown may be an edge or a flange of an aluminum pallet, as used for air freight purposes.

The result of this manner of placing the electronic responder is that the responder is mechanically well protected within the metal portion and forms no obstacle therebeyond, that the metal edge has hardly lost its solidity and that the electrical properties of the responder have not been affected by the placement in the metal.

It is observed that the outer edge 26 could be a transition to an adjoining metal edge or wall, e.g. a flange extending transversely to the plane of drawing. In that case, the slit 25 should continue into said flange as far as the edge of said flange or at least as far as such an interspace from the edge 26 that the influence of remaining circular currents 22 is sufficiently reduced.

Figure 8:
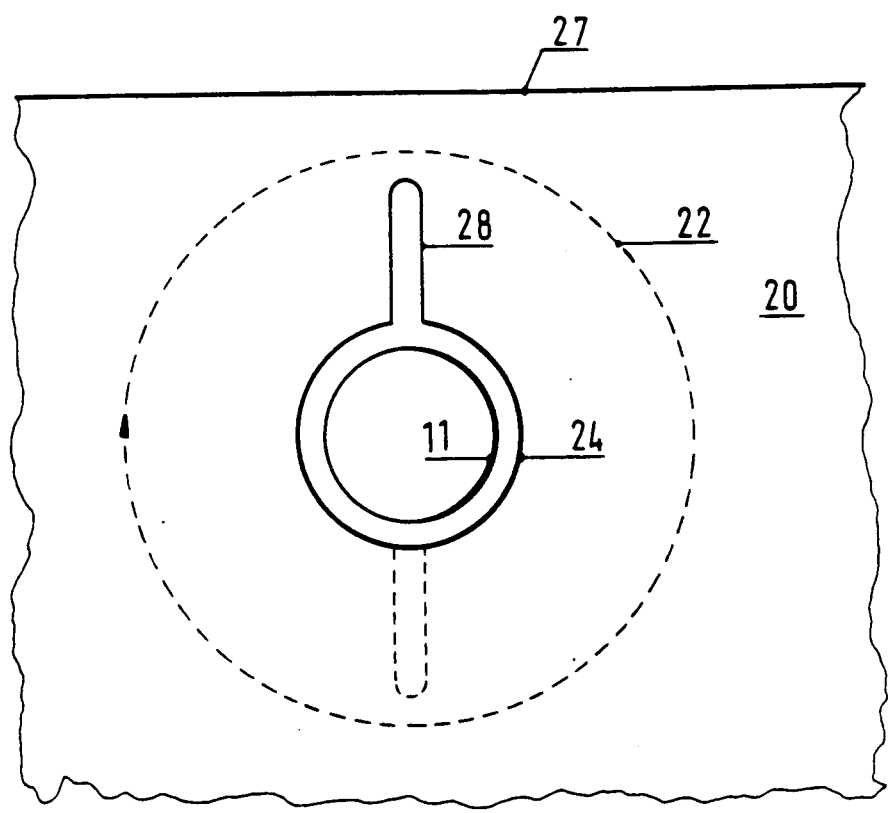
FIG. 8 diagrammatically shows a variant of the present invention.

Similar remarks apply when, for specific reasons, a responder is to be placed on or in a metal surface remote from the edges. This situation is shown in FIG. 8, wherein a responder with an antenna coil 11 is installed remote from the edges 27 of a metal article 20 in an opening 24. Projecting from opening 24, a slit 28 is provided that extends so far that circular currents of larger path diameter no longer inadmissibly affect the operation of the responder. The length of slit 28 can be established experimentally for each situation. Naturally, both in the situation shown in FIG. 7 and in that shown in FIG. 8, a plurality of slits may be used. By way of example, FIG. 8 shows a second slit at 29 in broken lines.

The bore and the slits made can be filled, if desired, with an insulating material, such as synthetic plastics. When the responder is mounted in or closely above or underneath the plane of the metal portion 20, this may be embedded in such a synthetic plastic material. The responder, however, may alternatively be placed some distance above or underneath a bore 24.

Furthermore, it may be desirable or necessary in certain situations to position an antenna coil of a transceiver unit near a conductive surface, in which case the above described technique can also be used in principle. This is shown in FIG. 7 with the coil 11 placed in or near the opening 24.

I claim:

1. A method of placing an electronic responder in an electrically conductive article for reducing the effects of the conductive article on the electronic responder, said responder having at least one coil designed as an antenna, said coil, in operation, receiving an alternating field produced by an interrogation means, comprising the steps of making a through-bore opening in a surface of the article in registry with the desired position of the responder, and having larger dimensions than the outer dimensions of the responder coil; forming at least one slit in the conductive article extending outwardly from a point on the perimeter of the throughbore opening along the surface of the article to diminish the electromagnetic influence of the conductive article on the electronic responder; and positioning said coil in a plane in said electrically conductive article in a way that the magnetic field lines traversing the coil no longer intersect the conductive article.

2. A method as claimed in claim 1, characterized in that a slit is provided that connects the opening and an edge of the conductive article.

3. A method as claimed in claim 2, wherein the article has a wall adjoining the said edge, characterized in that the slit connecting the opening and the edge continues into the adjoining wall.

4. A method as claimed in claim 1, characterized in that the opening and the at least one slit are filled with electrically non-conductive filler material.

5. A method as claimed in claim 4, characterized by using as filler material a mouldable synthetic plastics material, wherein the responder is embedded.

6. An electrically conductive article provided with an electronic responder of the type having at least one coil designed as an antenna, said coil, in operation, receiving an alternating field produced by an interrogation means, characterized in that the article is provided with a through-bore in its surface having a diameter larger than the largest outer dimension of the responder coil, and means for reducing undesirable effects of the conductive article on the electronic responder including at least one slit projecting outwardly from a point on the perimeter of the through-bore along the surface of the article, said responder being mounted in registry with the through-bore wherein said coil is positioned in a plane in said electrically conductive article in a way that magnetic field lines traversing the coil no longer intersect the conductive article.

7. An electrically conductive article as claimed in claim 6, characterized in that there is provided a slit connecting the through-bore to an edge of the article.

8. An electrically conductive article as claimed in claim 7, characterized in that the slit continues into a wall of the article adjoining the said edge.

9. An electrically conductive article as claimed in claim 6, characterized in that the through-bore and the at least one slit are filled with an electrically non-conductive filler material.

10. An electrically conductive article as claimed in claim 9, characterized in that the filler material is a mouldable synthetic plastics material, wherein the responder is embedded.

11. An electrically conductive article as claimed in claim 6, characterized in that the electrically conductive article is an edge portion of a metal pallet.

12. A method of placing an antenna coil of an electromagnetic interrogation means in an electrically conductive article and reducing the effects of the conductive article on the interrogation means, in which the interrogation means is of the type having at least one coil designed as an antenna, which coil, in operation, is capable of detecting an alternating field modulated by an electronic responder, comprising the steps of: making a through-bore opening in a surface of the article in registry with the desired position of the antenna coil, and having larger dimensions than the outer dimensions of the antenna coil; making at least one slit projecting outwardly from a point on the perimeter of the opening along the surface of the article in the conductive article to reduce electromagnetic coupling and positioning said coil in a plane in said electrically conductive article in a way that magnetic field lines traversing the coil no longer intersect the conductive article.

13. A method as claimed in claim 12, characterized in that a slit is provided which connects the opening and an edge of the conductive article.

14. A method as claimed in claim 13, wherein the article has a wall adjoining the said edge, characterized in that the slit connecting the opening and the edge continues into the adjoining wall.

15. A method as claimed in claim 12, characterized in that the opening and the at least one slit are filled with electrically non-conductive filler material.

16. A method as claimed in claim 15, characterized by using as filler material a mouldable synthetic plastics material, in which the antenna coil is embedded.

17. An electrically conductive article provided with an antenna coil of an electromagnetic interrogation means of the type having at least one coil designed as an antenna, said coil, in operation, being capable of detecting an alternating field modulated by an electronic responder, the article comprises a through-bore in a surface of the article having a diameter larger than the largest outer dimension of the antenna coil, and means for reducing the effects of the conductive article on the interrogation means, including at least one slit extending outwardly from a point on the perimeter of the through-bore along the surface of the article, with the antenna coil being mounted in registry with the through-bore wherein said coil is positioned in a plane in said electrically conductive article in a way that magnetic field lines traversing the coil no longer intersects the conductive article.

18. An electrically conductive article as claimed in claim 17, characterized in that there is provided a slit connecting the through-bore to an edge of the article.

19. An electrically conductive article as claimed in claim 18, characterized in that the slit continues into a wall of the article adjoining the said edge.

20. An electrically conductive article as claimed in claim 17, characterized in that the through-bore and the at least one slit are filled with an electrically non-conductive filler material.

21. An electrically conductive article as claimed in claim 20, characterized in that the filler material is a mouldable synthetic plastics material, wherein the responder is embedded.

22. An electrically conductive article as claimed in claim 17, characterized in that the electrically conductive article is a metal pallet.

* * * * *